United States Patent [19]
Martin et al.

[11] Patent Number: 5,702,735
[45] Date of Patent: Dec. 30, 1997

[54] MOLDING ARRANGEMENT TO ACHIEVE SHORT MOLD CYCLE TIME

[75] Inventors: Wallace Anthony Martin, Orange Park, Fla.; Wybren van der Meulen, Neunen, Netherlands; Edgar V. Menezes; Kornelis Renkema, both of Jacksonville, Fla.; Robert B. Phillips, Orange Park, Fla.; Victor Lust; Jongliang Wu, both of Jacksonville, Fla.; Gerbrand Eshuis, Hgogeveen, Netherlands

[73] Assignee: Johnson & Johnson Vision Products, Inc., Jacksonville, Fla.

[21] Appl. No.: 536,930

[22] Filed: Sep. 29, 1995

Related U.S. Application Data

[63] Continuation-in-part of Ser. No. 257,794, Jun. 10, 1994, Pat. No. 5,545,366.

[51] Int. Cl.$^6$ .................. B29C 33/38; B29C 45/73
[52] U.S. Cl. .................. 425/548; 249/114.1; 249/116; 264/25; 264/225; 425/552; 425/556; 425/588; 425/808
[58] Field of Search .................. 249/114.1, 116, 249/117, 134; 264/2.5, 225, 328.12, 328.16; 425/548, 552, 556, 588, 808, 812

[56] References Cited

U.S. PATENT DOCUMENTS

| | | | |
|---|---|---|---|
| 4,540,534 | 9/1985 | Grendol | 425/808 |
| 4,681,295 | 7/1987 | Haardt et al. | 425/808 |
| 5,376,317 | 12/1994 | Maus et al. | 425/552 |
| 5,388,803 | 2/1995 | Baumgartner et al. | 249/116 |
| 5,541,678 | 7/1996 | Awanohara et al. | 425/808 |
| 5,545,366 | 8/1996 | Lust et al. | 425/552 |

FOREIGN PATENT DOCUMENTS

| | | | |
|---|---|---|---|
| 489335 | 6/1992 | European Pat. Off. | 249/114.1 |
| 51-25071 | 7/1976 | Japan | 249/114.1 |
| 1-168412 | 7/1989 | Japan | 425/808 |
| 2-70407 | 3/1990 | Japan | 425/547 |
| 2-208012 | 8/1990 | Japan | 425/808 |
| 4-260619 | 9/1992 | Japan | 264/2.5 |

OTHER PUBLICATIONS

Abstract of Japanese reference 63-290231, Feb. 1989.

*Primary Examiner*—Robert Davis

[57] ABSTRACT

An apparatus for molding polystyrene mold halves which are used, for subsequent molding of a soft contact lens. The apparatus is designed with superior heat conduction capacity so as to minimize the molding cycle time, while simultaneously producing uniformly precise and accurate optical quality surfaces. Molten polystyrene is provided via a hot runner system to a plurality of mold cavities. In a specific variation, the convex surface provides the optical quality surface to the concave surface of the mold half produced thereby. The structural element which defines the convex surface includes a hollow cylindrical bushing and a removable power insert mounted therein, which may be changed so that the prescription strength of the contact lens to be formed by the mold may be varied. In a first embodiment, the power insert includes only a convex surface at its operational end. In a second embodiment, the power insert includes an annular flat surface surrounding the convex surface, defining at the junction therebetween a discontinuity of curvature, which imparts a sharp edge to the mold half formed thereby. The power insert may be constructed of pure steel, or alternatively, it may be made of brass, copper chromium, or cobalt-nickel alloyed martensitic steel. The power insert may be coated with a surface layer of nickel phosphor or silicone oxide, or chrome nitride. These layers may be turned to their proper thicknesses and dimensions by diamond cutters, and they may be thermally hardened.

44 Claims, 8 Drawing Sheets

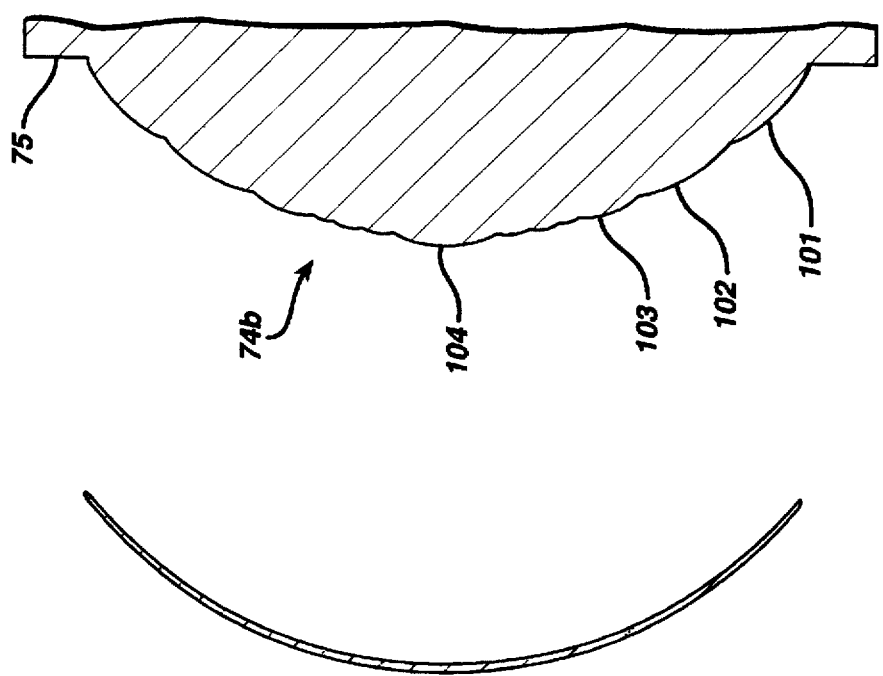
FIG. 10c
FIG. 10b
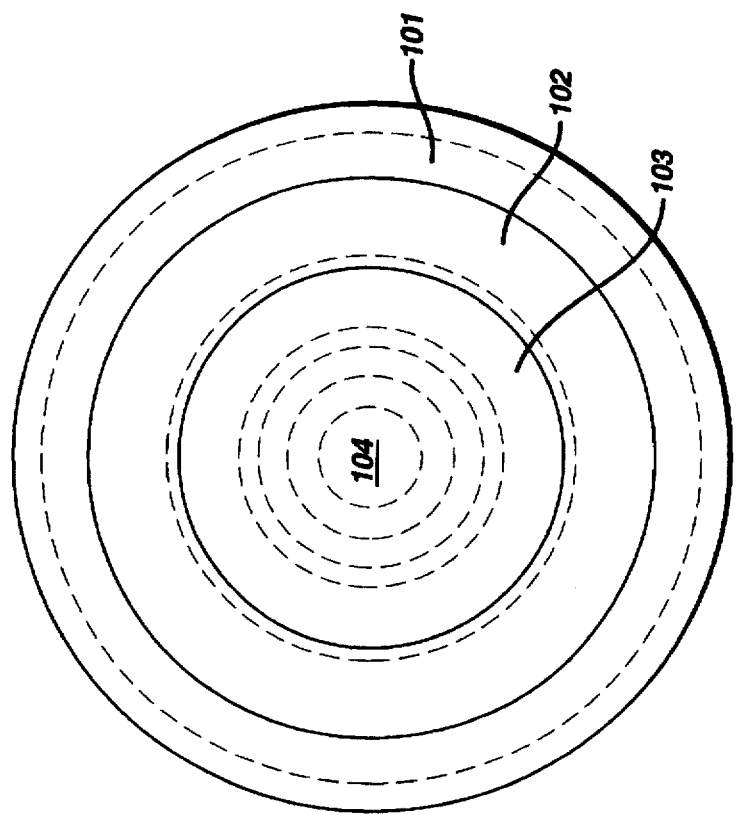
FIG. 10a

MOLDING ARRANGEMENT TO ACHIEVE SHORT MOLD CYCLE TIME

CROSS-REFERENCE TO RELATED CO-PENDING APPLICATION

This application is a continuation-in-part of application U.S. Ser. No. 08/257,794 filed Jun. 10, 1994 and is now U.S. Pat. No. 5,545,366, entitled "Molding Arrangement To Achieve Short Mold Cycle Time."

BACKGROUND OF THE INVENTION

1. Field of the Invention

The present invention relates generally to an apparatus and method for molding front and back curve mold halves which are used for subsequent molding of a soft contact lens therebetween, and more specifically to an apparatus and method for molding a front or back polystyrene mold half which considers heat flow constraints, optical quality mold surface requirements, and maintenance and assembly procedures.

2. Discussion of the Prior Art

U.S. Pat. No. 4,565,348 to Larsen discloses a typical prior art approach to manufacturing mold halves similar to the present invention. Pursuant to this prior art approach, the mold halves are molded as a set of eight mold halves carried on a frame in a 2×4 array. FIG. 3 of the Larsen patent illustrates a molded frame carrying a 2×4 array of concave front or female mold halves, while FIG. 5 therein shows a molded frame carrying a 2×4 array of convex back or male mold halves. The cluster assembly of the frame and molds is manufactured by injection molding the assembly as one piece with the molds being secured within an outer rectangular frame by small struts extending between the frame and the molds. The height of the frame is such that the surfaces of the molds are protected from scratching and mechanical damage during handling, and the frame in general has a shape facilitating stacking and handling. This prior art approach of molding such polystyrene mold halves in a cluster assembly typically takes approximately twenty-four (24) seconds, which is too long for the efficient production of such polystyrene mold halves. In contrast thereto, pursuant to the present invention, the molding of such polystyrene mold halves takes approximately three to six seconds, depending upon the wall thickness.

In this prior art approach, complementary sets of front and back mold halves are used in the production of hydrogel contact lenses by direct molding of a monomer mixture wherein the mixture is dissolved in a non-aqueous, water-displaceable solvent. After a dosing step in which the front concave mold halves are substantially filled with the polymerization mixture, the concave front mold halves are covered with the back mold halves in a manner in which no air bubbles are trapped beneath the back mold halves, which are brought to rest on the concave front mold halves properly aligned and without distortion. This is preferably performed with back mold halves which are put on as individual units on the pools of polymerizable mixture held in the front concave mold halves. Accordingly, prior to the mold covering step, the plurality of back mold halves are separated from the frame by breaking or cutting. The back mold members are preferably held by a mechanical device while they are separated from the frame and which thereafter is used to guide them down and place them all simultaneously on each of the concave front mold halves containing the polymerizable mixture. The monomer/solvent mixture is then subjected to conditions whereby the monomer(s) polymerize, such as irradiation with actinic visible or ultraviolet radiation, to thereby produce a polymer/solvent mixture in the shape of the reduced final size of the desired hydrogel lens.

After the polymerization process is completed, the two halves of the mold are separated (called demolding), typically leaving the contact lens in the front mold half, from which it is subsequently displaced. The front and back mold halves are used for only a single molding, after which they are disposed of. After the polymerization is complete, the solvent is displaced with water to produce a hydrated lens the final size and shape of which are quite similar to the size and shape of the original molded polymer/solvent article. The direct molding of hydrogel contact lenses is disclosed in U.S. Pat. No. 4,495,313 to Larsen, U.S. Pat. No. 4,680,336 to Larsen et al., U.S. Pat. No. 4,565,348 to Larsen, and U.S. Pat. No. 4,640,489 to Larsen et al., the entire disclosures of which are hereby incorporated by reference in this patent application.

SUMMARY OF THE INVENTION

Accordingly, it is a primary object of the present invention to provide a molding arrangement with a mold insert design, heat removal process, and processing to achieve a short mold cycle time.

Additionally, it is a consideration that the specific embodiments of such an apparatus be such that the optical surfaces of the molding machine be interchangeable, so that each molding machine is able to produce a variety of different prescription lens molds. It is advantageous for such a mold part to be easily interchangeable, whereby swift alteration of the mold shape may be executed, without concern for damaging either the optical surface or the attending structures.

The manufacture of the mold halves involves the separate molding of each front mold half and of each back mold half. The inner concave surface of the front mold half defines the outer surface of the contact lens, while the outer convex surface of the back mold half defines the inner surface of the contact lens which rests upon the eye. Accordingly, the shape of the inner concave surface of the female mold half and the shape of the outer convex surface of the male mold half must have acceptable optical quality surfaces. The present invention provides molding and very rapid cooling of the critical optical quality surfaces of the contact lens molds, i.e., the inner concave surface of the front mold half and the outer convex surface of the back mold half.

A further object of the subject invention is the provision of a molding arrangement designed to simultaneously mold a plurality of mold halves in a plurality of separate mold cavities, each of which is positioned to space the optical quality surface of the mold cavity further from the heat source of a heated hot runner system of an extruding machine than the second (non-optical quality) surface of the mold cavity. This arrangement allows the optical quality surface of the mold cavity to be cooled as rapidly as possible, to allow quicker setting and locking of temperature residual stresses on the optical quality side of the mold half, thereby resulting in a faster molding and cycle time. This results in the slightly cooler optical quality side of the mold half having slightly less dimensional variation than the second (non-optical quality) surface of the mold half. Moreover, each individual mold surface (optical and non-optical) is cooled separately by coolant circulated around the mold cavity.

The present invention takes a different approach from the prior art as exemplified by Larsen U.S. Pat. No. 4,565,348, and molds individual mold halves in individual mold cavities, each of which produces a nonattached mold half (i.e., not attached to a cluster of similar mold halves). Each individual mold surface is positioned and cooled to achieve a reduced cycle molding time. Moreover, the flow length distance of the polymer has been significantly reduced relative to prior designs, which greatly enhances the ability to optimize the optical attributes of the resultant mold half. There is less probability of freezing the flow passageway as mold temperatures are reduced further to improve cycle time.

Each mold half defines an optical quality surface (i.e., the concave surface in the front mold half and the convex surface in the back mold half). Each mold half also defines a circumferential flange around the convex and concave surfaces. In general, the mold halves are processed and handled by robotic handling systems which handle (as by vacuum grasping) the back side of the flange which is on the opposite side from the optical quality surface of the mold half.

In accordance with the teachings herein, the present invention provides a molding arrangement and method for molding a mold half which is used, with a second complementary mold half, for the subsequent molding of a soft contact lens. Each mold half defines a convex curved surface and a concave curved surface spaced therefrom, with one of the convex and concave surfaces defining an optical quality curved surface for the soft contact lens. A heated mold (to ensure the flow rate does not decrease and shear stresses increase) introduces a molten mold material, such as from a family of thermoplastics, such as polystyrene, polycarbonate, poly [4-methyl-pentene 1] (TPX), polyvinyl chloride (PVC), polyethylene, polypropylene, copolymers of styrene with acrylonitrile or butadiene, acrylates such as polymethyl methacrylate, polyacrylonitrile, polyamides, polyesters, etc. through a hot runner system to at least one (preferably more) mold cavity. Each mold cavity defines an optical quality curved surface and also a second noncritical curved surface for the mold half.

Pursuant to the teachings of the present invention, the optical quality surface of the mold cavity is positioned further away from the heated hot runner side of the mold system than the second surface of the mold cavity, and a cooling system is provided for cooling the mold cavity. The positioning of the optical quality curved surface further away from the heated hot runner system allows faster cooling of the optical quality surface of the mold cavity. This allows quicker setting and locking of temperature residual stresses on the optical quality side of the mold half and a faster molding cycle time. This results in the slightly cooler optical quality side of the mold half having slightly less dimensional variation than the second (non-optical quality) surface of the mold half.

When the mold half is a front or female mold half, the concave surface of the female mold half defines the optical quality surface, and the concave surface of the female mold half is positioned further away from the heated hot runner system than the second surface. When the mold half is a back or male mold half, the convex surface of the male mold half defines the optical quality surface, and the convex surface of the male mold half is positioned further away from the heated hot runner system than the second surface.

In a preferred embodiment, the material being molded into the mold half is polystyrene, but could be any suitable thermoplastic such as mentioned hereinabove in the family of thermoplastics. Moreover, the mold cavity comprises a first insert on the optical quality side of the mold cavity and a second insert on the second side of the mold cavity. Each insert can be manufactured as one integral component, or can be a two-piece design. It is preferable that if the convex insert (the insert forming the concave portion of the mold) is an optical surface defining insert, it should comprise two pieces. If the concave insert (the insert defining the convex portion of the mold) is an optical surface, it may comprise a single element, as is the non-optical surface defining insert of both possible arrangements. The following description of two variations of the optical surface defining insert is set forth with the optical surface being the convex portion of the insert, and the non-optical surface being the concave portion. The specific arrangement which is used for description of the specific embodiments of the invention are for the production of the front curve mold halves.

In the instance wherein the mold insert is a convex optical surface defining insert it comprises two pieces: a bushing, and a power insert positioned within the bushing. The bushing comprises a cylindrical body, through which the power insert is positioned. In a first embodiment, the power insert has an entirely convex end surface which extends beyond the end of the bushing and defines the optical quality surface, which also defines the optical power of a contact lens which is subsequently produced by the front mold half. The end of the bushing, out from which the convex end of the power insert extends, comprises an annular flat surface which circumferentially surrounds the curvate end of the power insert. The circular interface defined at the radial extent of the convex surface and the inner radial extent of the annular flat surface of the bushing comprises a sharp discontinuity of curvature, and defines an sealing edge for separating the extra hydrophilic material from that which forms the lens during the mold filling stage. The different optical power (diopter) lenses can be produced by merely changing the power insert to substitute a different power insert having a different curvature convex end surface.

In the second variation, the power insert is similarly disposed within a bushing, however, the optical surface defining surface thereof comprises both the convex protuberance and a region of annular flat surface therearound. A sharp discontinuity of curvature between the convex surface and the annular flat region is produced by special surface treatment and grinding which is set forth more fully in the Detailed Description provided hereinbelow. The bushing into which this variation of the power insert is disposed understandably comprises a wider central volume, and a wider orifice at the operational end. The bushing does, however, comprise an annular flat surface which is preferably aligned to be co-planar with the annular region of the power insert.

In both variations, the second insert on the second side of the mold cavity does not define as high an optical quality surface, and so can easily be manufactured as one integral component.

Each of the insert embodiments, as well as the non-optical surface inserts includes a bubbler positioned internally therein, through which coolant is circulated by the cooling system in a turbulent mode against inner surfaces of the insert. Moreover, each embodiment of the optical surface defining inserts, and the non-optical inserts, have a circumferential cooling passageway disposed therearound. In the two piece insert, the passageway is defined either in the exterior surface of the bushing element, or in the steel mold block retaining the insert, through which coolant is circulated in a turbulent mode by the cooling system.

In a preferred embodiment, the molding arrangement includes a plurality (such as four or eight) of mold cavities positioned at one end of, and spaced around, the hot runner system.

In the arrangement and method of the present invention, a heated molding machine introduces a molten mold material through a hot runner system to at least one mold cavity. As set forth hereinabove, each mold cavity defines an optical quality curved surface and also a second curved surface for the mold half. Pursuant to the teachings of the present invention, the mold cavity comprises a first insert on the optical quality side of the mold cavity and a second insert on the second side of the mold cavity. Each of the first and second inserts has a circumferential cooling passageway therearound or in proximity of the insert, through which coolant is circulated by a cooling system to provide for faster cooling of the mold cavity. This allows quicker setting and locking of minimal temperature residual stresses in the mold half and a faster molding and cycling time. Also, the direct polymer flow path reduces the cooling time (locks in the minimal residual stresses) to reduce the cycle time.

BRIEF DESCRIPTION OF THE DRAWINGS

The foregoing objects and advantages of the present invention for a molding arrangement having a mold insert design to achieve short mold cycle time may be more readily understood by one skilled in the art with reference being had to the following detailed description of several preferred embodiments thereof, taken in conjunction with the accompanying drawings wherein like elements are designated by identical reference numerals throughout the several views, and in which:

FIG. 6a illustrates a first variation of the power insert wherein the operational end thereof consists entirely of a curvate surface and a corresponding first variation of the bushing comprises the entire annular flat surface, and FIG. 6b illustrates a second variation of the power insert wherein the operational end thereof comprises both a curvate portion and an annular flat surface, and a corresponding bushing comprises an annular flat surface which is co-planarizable with the annular flat surface of the insert;

FIG. 10a is an enlarged diagrammatic front view of contact lens having a complex optical geometry, such as a maltizone on a/or bifocal contact lens.

FIG. 10(b) is an enlarged cross section view taken along section line 10–10' of FIG. 10(a).

FIG. 10(c) is a partial cross section of a portion of the power insert of FIG. 9 with the surface contour there of greatly exaggerated for the purpose of illustration.

DETAILED DESCRIPTION OF THE DRAWINGS

Figure 2A:
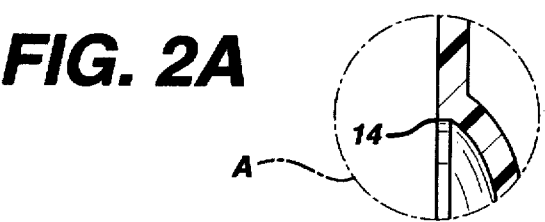
FIG. 2a is an enlarged view of the encircled portion of FIG. 2.
Figure 1:
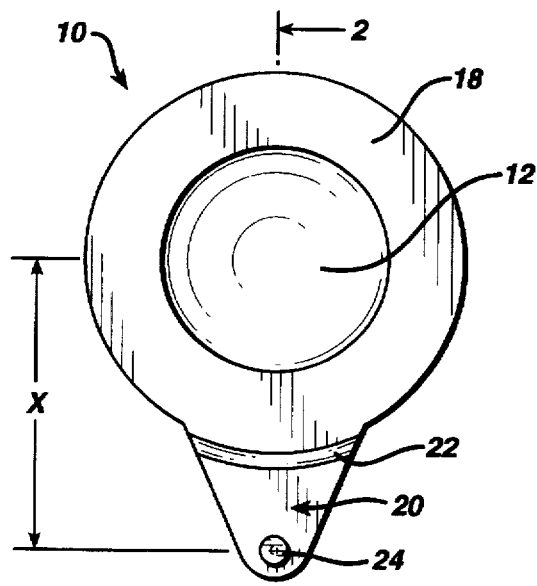
FIGS. 1 and 2 are respectively top elevational and side sectional views of one embodiment of a front (female) mold half which is produced pursuant to the present invention.
Figure 2:
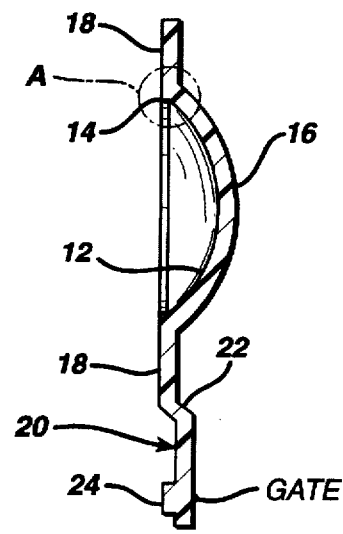

Referring to the drawings in detail, FIGS. 1 and 2 illustrate respectively top elevational and side views of one embodiment of a front mold half 10 useful in the production of a contact lens by the polymerization of a polymerizable composition in a mold assembly composed of two complementary front and back mold halves. The front mold half 10 is preferably formed of polystyrene, but could be any suitable thermoplastic such as mentioned hereinabove in the family of thermoplastics, which is transparent to visible and ultraviolet light to allow irradiation therethrough with light to promote the subsequent polymerization of a soft contact lens. A suitable thermoplastic such as polystyrene also has other desirable qualities such as being moldable to surfaces of optical quality at relatively low temperatures, having excellent flow characteristics and remaining amorphous during molding, not crystallizing, and having minimal shrinkage during cooling.

The front mold half 10 defines a central curved section with an optical quality concave surface 12, which has a circular circumferential well defined edge 14 extending therearound. The edge 14, shown in detail A of FIG. 2, is desirable to form a well defined and uniform plastic radius parting line (edge) for the subsequently molded soft contact lens. The well defined edge 14 actually has a very small curvature which can be in the range of 3–45 um, or less preferably 5–30 um, and the surfaces defining the edge can form an angle in the range of 75°–90°. A generally parallel convex surface 16 is spaced from the concave surface 12, and an annular essentially uniplanar flange 18 is formed extending radially outwardly from the surfaces 12 and 16. The concave surface 12 has the dimensions of the front curve (power curve) of a contact lens to be produced by the front mold half, and is sufficiently smooth such that the surface of a contact lens formed by polymerization of a polymerizable composition in contact with the surface is of an optically acceptable quality. The front mold half is designed with a thickness to transmit heat therethrough rapidly (typically in the range of 0.4 to 1.2 mm, preferably in the range of 0.5 to 1.0 mm, and most preferably in the range of 0.6 to 0.8 mm, and in one embodiment was selected to be 0.8 mm) and rigidity to withstand prying forces applied to separate the mold half from the mold assembly during demolding.

The front mold half or curve thickness was reduced from 1.5 mm in prior designs to 0.8 mm. This had a direct impact on cycle time reduction. Using a one dimensional heat flow, the cooling differential equation is:

$$\frac{\partial T}{\partial t} = a\frac{\partial^2 T}{\partial^2 t} \qquad a = \frac{k}{eCp} = \text{thermal diffusivity}$$

$$\text{cooling time} = \frac{-r^2}{\pi^2 a} \ln\frac{4}{\pi} \; \frac{T\text{melt} - T\text{mold}}{T\text{demold temp} - T\text{mold}}$$

The thermal diffusivity is proportional to specific heat, thermal conductivity, density. The cooling rate is determined by the thermal diffusivity of the material. The higher the thermal diffusivity, the faster the cooling rate.

The front mold half or curve 10 further defines a tab 20 integral with the flange 18 which projects from one side of the flange. The tab 20 extends to the injection hot tip (by the notation GATE) which supplies molten thermoplastic to the mold. The gate diameter is typically in the range of 0.4 to 1.4 mm, preferably in the range of 0.6 to 1.2 mm, and most preferably in the range of 0.8 to 1.0 mm, and is selected to result in minimal shear stress in the molten thermoplastic which is injected. Control of the gate size also helps to control the flow rate of the molten thermoplastic, which (in conjunction with temperature and rate of heat removal) helps control the final dimensional characteristics of the molded part and optimizes the processing of the molded part. The optimum size of the gate is calculated by considering the material flow index of the thermoplastic polymer, the wall thickness, part volume, an also considering the hot runner tip temperature and mold temperature.

The injection point feeds into a planarizing zone which fulfills several important functions. The planarizing zone is generally thin and flat, preferably having the same thickness as the rest of the mold cavity. The planarizing zone preferably is generally triangular, having an apex near which the injection gate point feeds molten thermoplastic into the planarizing zone. The planarizing zone diverges gradually in width from the apex region toward the rest of the mold cavity. Where the planarizing zone intersects the flange portion of the mold, the width diverges more, preferably uniformly from both sides of the zone. Thus, the planarizing zone is preferably symmetrical about the plane formed by the injection point and the axis of the concave surface of the molds.

One function of the planarizing zone is planarizing the flow of the injected molten thermoplastic into a smoothly steadily advancing flow of material filling the zone and feeding directly into the flange and concave-convex regions of the mold. Controlling the flow characteristics imparted by the dimensions of the planarizing zone, in conjunction with the feed pressure, flow rate, and temperature of the molten thermoplastic and the rate of heat withdrawal therefrom, enables obtaining the desired characteristics of the completed mold half.

The planarizing zone also serves to form the tab 20 which is integral with the rest of the completed mold half and is an essential part of that article.

The tab 20 defines therein an angled (e.g., 45°) web section 22, which is included in the design to break up the flow of molten thermoplastic in the molding process prior to the flow entering the optical quality portion of the mold. A step is created in the tab to break the polymer flow and smooth out the advancing melt flow, thus reducing and preferably eliminating jetting of the flowing molten thermoplastic which could lead to sink marks, dimensional inconsistency, and unacceptable irregularities in the surface of the molded mold half. The step forces a reversal of the melt momentum back to the start. This in turn causes the polymer to form an advancing front which fills the cavity more smoothly. This also moves the air in the mold cavity towards the vent lines and results in an optical part free of weakness lines, thus producing a dimensionally superior part.

Vent lines are provided in the mold to assist in removing air therefrom and preventing possible melt flow stagnation. In a preferred embodiment, the vent lines are provided outside and spaced around the annular flange at locations spaced furthest from the mold gate. If this concept is not properly engineered, the flange opposite the hot runner side can have weld lines at the converging melt flows. The hot runner gate is positioned, and the tab is designed, to allow for even and uniform polymer flow so that the advancing polymer flow does not produce weld lines, which are a source of surface imperfection, mechanical stress, and a point of weakness.

Moreover, the front mold half 10 also defines a small circular projection 24 which is positioned across from the injection hot tip which supplies molten thermoplastic to the mold. The projection 24 functions as a trap to immobilize a small slug of cold thermoplastic which may form at the injection hot tip between molding cycles. The plastic well immobilizes a small slug of cold thermoplastic which may form at the injection hot tip between molding operations, and essentially captures the initial melt flow from the hot runner gate tip. Thus, the well 24 is positioned adjacent to the point at which the molten thermoplastic is injected into the mold. Preferably, the well 24 is directly across from that point, the better to catch the first injected thermoplastic. It is imperative that during initial injection this mass of cold polymer be trapped in the cold well and not enter the melt stream. This could cause part dimensional variations due to melt temperature and possible shrinkage variation, jetting, and freezing of the melt flow. Variations of the tab length in conjunction with the size of the cold well can vary, for example, with a longer tab length and smaller cold slug well.

The location of the hot runner gate on the tab with respect to the optical surface ensures minimal heat distortion and part dimensional stability. The location of the gate and tab geometry is designed to prevent polymer jetting (which causes marks and dimensional variations). When the melt flow hits the cold slug plane and then the step 22, impinging occurs which smooths out the melt flow. The abrupt transition at the step prevents transportation of a cold surface layer into the rest of the mold. The radius at the transition step and divergence angle of the tab, in conjunction with the flow rate and the injection pressure, results in a laminar flow of the melt flow into the optical cavity and prevents the jetting phenomena. The cold slug well opposite the gate captures the first part of the polymer stream, which allows a more homogeneous melt front which relates to optical quality.

The design of the flange 18 helps demolding and part handling, and also protects the optical surfaces and the well defined edge as described earlier. The geometry of the tab 20 serves an additional function in straightening and orientating the assembled front curve/back curve prior to demolding. When a front mold half or curve is assembled with a back mold half or curve, a gap is formed between the two projecting tabs which is important for demolding. The gap between the tabs typically has a range of 0.5 to 3.0 mm, preferably has a range of 1.0 to 2.5 mm, and most preferably has a range of 2.0 to 2.25 mm and is needed to initiate the demolding operation.

A finite element analysis enabled a better design of the part geometry from the following points:

hot runner gate location;

filling time for cycle time reduction;

weld lines, air traps, flow direction;

ease of filling the mold;

shear rate, shear stress and temperature profiles;

cooling requirements.

This type of analysis based on fluid dynamics (rheology) and thermodynamics is used to give approximations for momentum and energy of the melt flow.

The flow length distance of the polymer has been significantly reduced relative to prior designs, which greatly enhances the ability to optimize the optical attributes. There is lesser probability of freezing the flow passageway as mold temperatures are reduced further to improve cycle time. One unexpectedly advantageous aspect of the present invention is that operations are carried out at higher thermoplastic temperatures while still realizing successful production within shortened cycle times.

Figure 3:
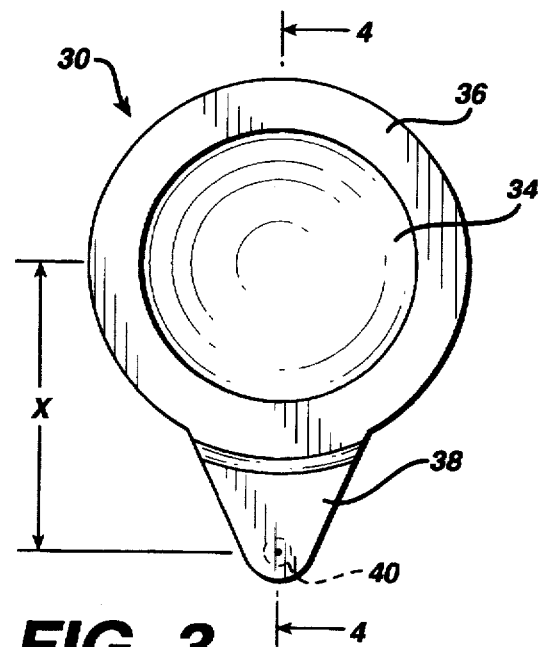
FIGS. 3 and 4 are respectively top elevational and side sectional views of one embodiment of a back (male) mold half which is produced pursuant to the present invention.
Figure 4:
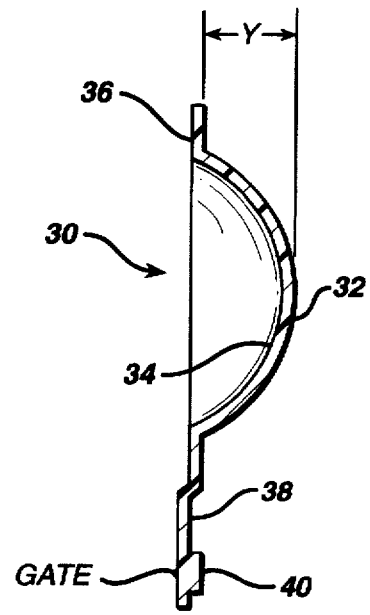

FIGS. 3 and 4 illustrate respectively top elevational and side views of one embodiment of a back mold half 30. The back mold half 30 is designed with all of the same design considerations mentioned hereinabove with respect to the front mold half 10.

Figure 5:
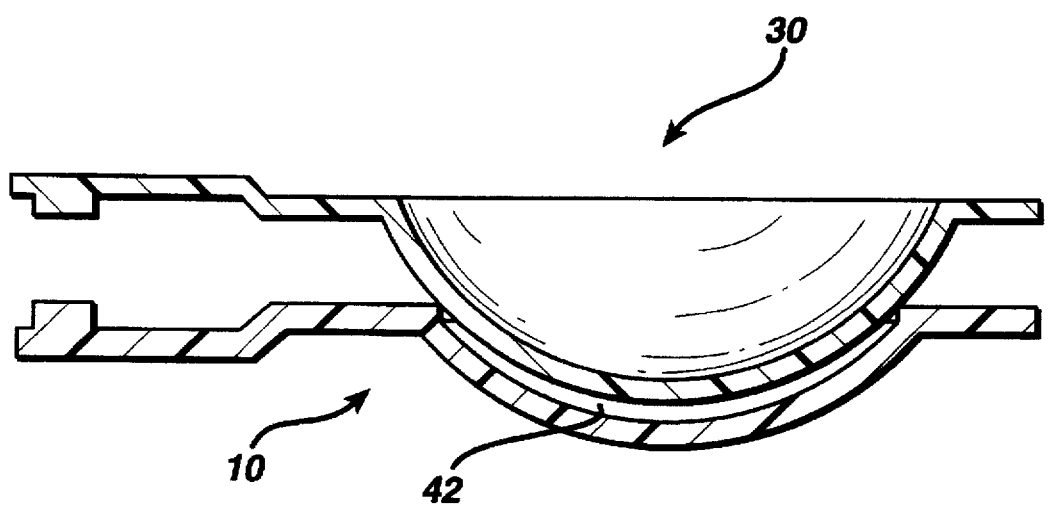
FIG. 5 is a side elevational sectional view of a mold assembly which includes a front mold half and a back mold half.

FIG. 5 illustrates a mold assembly in which a back mold half 30 is positioned on top of a front mold half 10, and illustrates the mold cavity 42 formed therebetween, as well as the defined gap between the opposed flanges of the back and front mold halves.

The back mold half 30 is also preferably formed of polystyrene, but could be any suitable thermoplastic such as mentioned hereinabove in the family of thermoplastics. The back mold half 30 defines a central curved section with an optical quality convex surface 32, a generally parallel concave surface 34 spaced from the convex surface 32, and an annular essentially uniplanar flange 36 formed extending radially outwardly from the surfaces 32 and 34. The convex surface 32 has the dimensions of the rear curve (which rests upon the cornea of the eye) of a contact lens to be produced by the back mold half, and is sufficiently smooth such that the surface of a contact lens formed by polymerization of a polymerizable composition in contact with the surface is of optically acceptable quality. The back mold half is designed with a thickness to transmit heat therethrough rapidly (typically in the range of 0.4 mm to 1.2 mm, preferably in the range of 0.5 to 0.8 mm, and most preferably in the range of 0.6 to 0.8 mm, and in one embodiment was selected to be 0.6 mm) and rigidity to withstand prying forces applied to separate the mold half from the mold assembly during demolding.

The back curve is designed with a back curve sag typically in the range of 1.5 to 6.5 mm, preferably in the range of 2.5 to 6.0 mm, and most preferably in the range of 5.1 to 5.8 mm (see FIG. 4 for the predetermined sag, dimension "Y"). The back curve sag and above specified ranges of thickness serve two purposes:

1. The back curve sag results in a gap typically in the range of 0.5 to 3.0 mm, preferably in the range of 1.0 to 2.5 mm, and most preferably in the range of 2.0 to 2.25 mm between the assembled back curve and front curve, which assists in mechanically removing the back curve from the front curve matrix after polymerization.

2. With a part thickness in the above specified ranges, the back curve was designed to reduce the occurrence of weld lines on the distal side of the flange (where two melt flows converge) which could detrimentally cause a fracture line on the back curve.

The back mold half or curve 30 also defines a tab 36 integral with the flange which projects from one side of the flange. The tab 36 extends to the injection hot tip which supplies molten thermoplastic to the mold, and also defines therein an angled (e.g., 45°) section 38 for the same reasons as in the front mold half 10. The back mold half 30 also defines a small circular projection 40 for the same reasons as in the front mold half 10.

The tab design length "X," FIG. 3, is important for the following reasons:

minimizes heat distortion to the optical side of the part;
the location and the distance are important;
consistency of roundness for optical power radius;
cycle time reduction;

length X can vary typically in a range of 10 to 30 mm, preferably in a range of 12 to 26 mm, and most preferably in a range of 16 to 24 mm.

To achieve a minimized molding time, the thickness of each mold half should be reduced as much as possible, while considering other design constraints such as the desired rigidity of each mold half. In general, the back mold half 30 should be more flexible than the front mold half 10 and so is slightly thinner. The thickness of the front mold half 10 is thinner than a comparable prior art mold half which generally had a thickness on the order of 1.4 mm.

In one designed embodiment, the back curve and front curve thicknesses were chosen to be in the specified ranges, specifically 0.6 mm and 0.8 mm, respectively, to ensure adequate polymer flow without freezing the advancing melt flow, maintain the proper strength and rigidity during demolding, minimize weld line formations, and optimize cycle time reduction.

The inner concave surface of the front mold half defines the outer surface of the contact lens, while the outer convex surface of the back mold half defines the inner surface of the contact lens which rests upon the eye. Accordingly, the shape of the inner concave surface of the female mold half and the shape of the outer convex surface of the male mold half must have acceptable optical quality surfaces. The outer convex surface of the front mold half and the inner concave surface of the back mold half need not have optical quality surfaces, and in fact the side of each mold half having one of those surfaces is used by robotic handling equipment to handle the mold halves. The present invention takes advantage of this latter feature to provide molding and very rapid cooling of the critical optical quality surfaces of the contact lens molds, i.e., the inner concave surface of the front mold half and the outer convex surface of the back mold half.

Pursuant to the present invention, the master molds to mold the thermoplastic mold halves or curves are designed to achieve excellent heat transfer characteristics to quickly reduce the temperature of the molds from approximately 200°–300° C. at the injection tip (by the arrow designated GATE) at which the molten thermoplastic enters the mold to approximately 80°–90° C., when the mold halves can be opened in approximately three to six seconds, as compared with a typical 24 second mold cycle for the prior art.

Figure 6A:
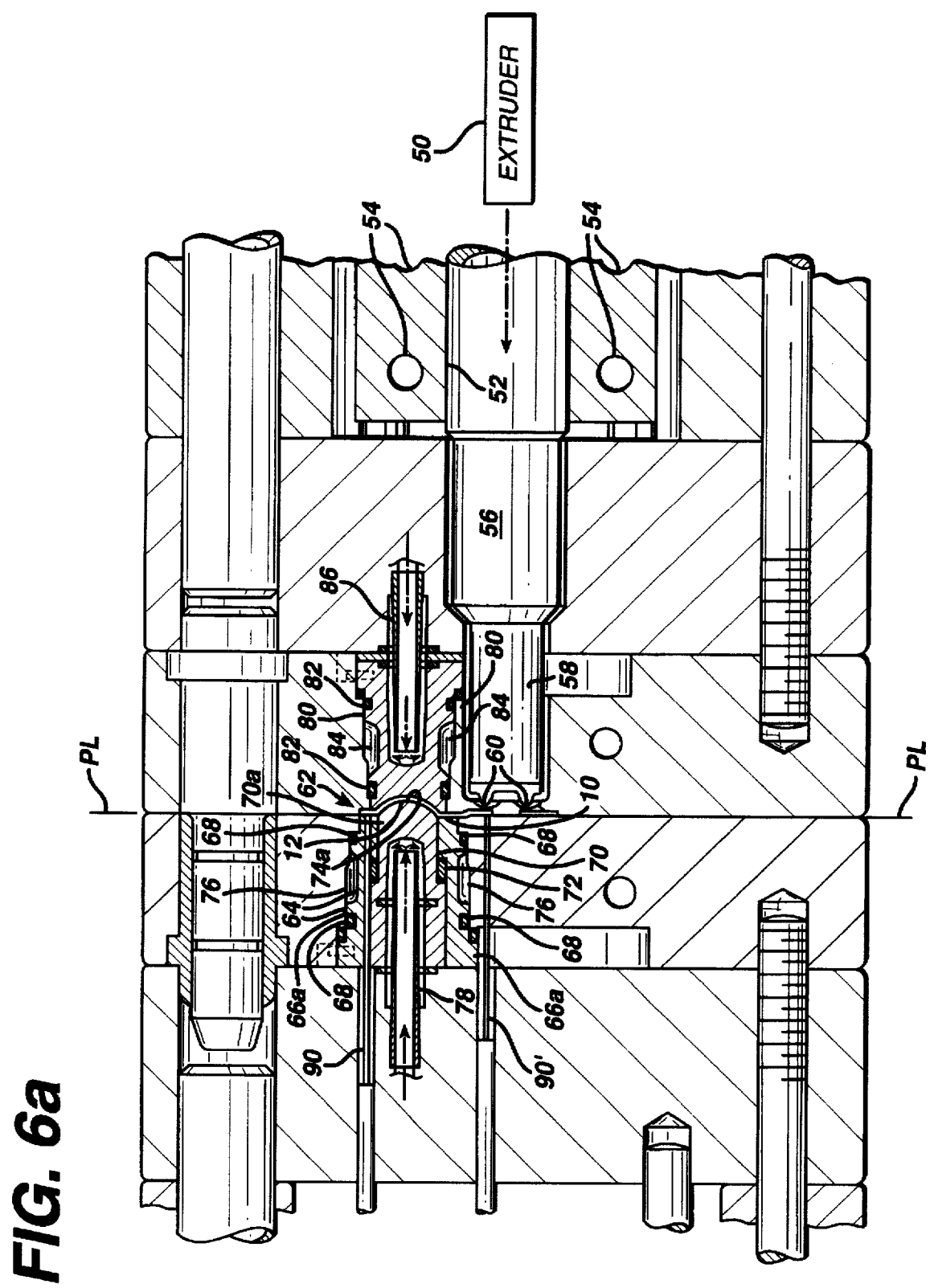
FIGS. 6a and 6b are sectional views through hot runner mold constructed pursuant to the teachings of the present invention, in which one of eight similar mold cavities for a front mold half is shown in section to illustrate the construction of each mold cavity, wherein respectively.
Figure 6B:
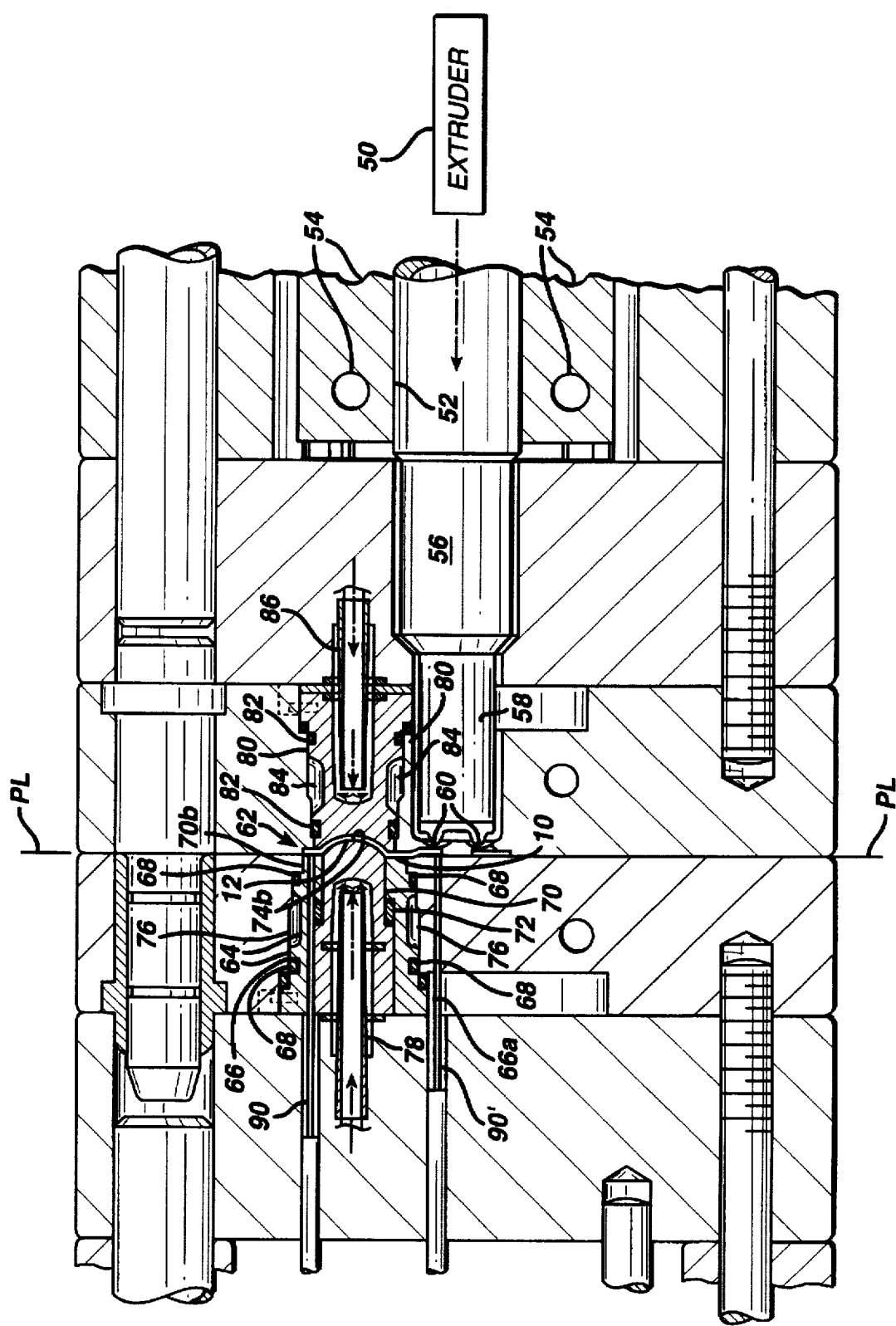

Pursuant to the present invention, and referring to FIGS. 6a and 6b, two variations of the molding assembly are shown. In each, molten thermoplastic material is initially extruded by a screw extruder 50. When polystyrene is used as the molten thermoplastic material, the discharge end of the screw extruder 50 has a temperature of approximately 200°–300° C. The molten thermoplastic material is then introduced into a heated manifold 52 having heaters 54 therein to raise the temperature of the molten thermoplastic material further, in the case of polystyrene to approximately 270°–280° C. The molten thermoplastic material then flows into a hot runner system 56 which feeds two multi-tip extruders 58 (only one of which is shown in FIGS. 6a and 6b), each of which has four hot tip extrusion apertures 60, two of which are illustrated in FIGS. 6a and 6b; at this point molten polystyrene is approximately 200°–300° C. One or more temperature sensors, such as thermocouples, may be strategically positioned in the molding arrangement to monitor the temperature of the molten thermoplastic, to control heaters or other parameters for control of the molding operation. Each hot tip extrusion aperture feeds a single mold cavity 62, one of which is illustrated in FIGS. 6a and 6b. One preferred molding arrangement includes eight mold cavities of the type which are positioned at the end of, and spaced around, the multi-tip extruders 58.

Figure 7:
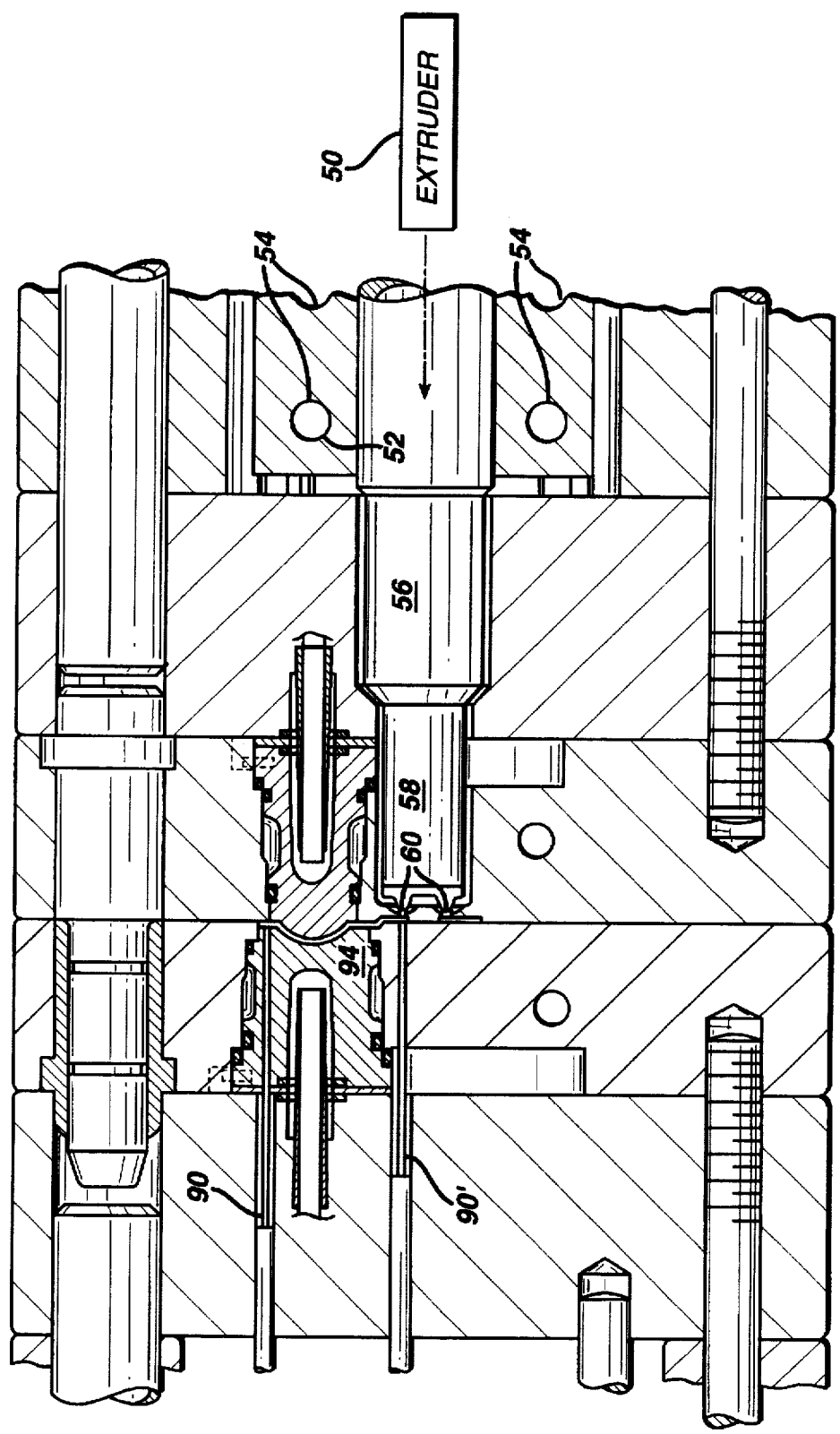
FIG. 7 is a sectional view through a hot runner mold similar to that of FIGS. 6a and 6b, but for a back mold half.

The embodiments shown in FIGS. 6a and 6b are designed to manufacture front curve molds. FIG. 7, which is described more fully hereinbelow, illustrates an assembly for the manufacture of back curve molds. In each embodiment, one of the features of the present invention is that the optical quality surface of the mold half is positioned away from the heat source of the extrusion equipment, while the second non-optical quality surface of the mold half is positioned towards the heat source of the extrusive equipment. The concave surface 12 of the front mold half defines the optical quality surface, and accordingly the concave surface 12 D of the front mold half is positioned on the left side in the molding arrangement of FIGS. 6a and 6b.

The molding cavity 62 illustrated in each of FIGS. 6a and 6b includes a two piece optical surface molding insert 64 on the left side, and a concave single piece non-optical insert on the right side. Referring now specifically to the embodiment shown in FIG. 6a, the convex optical surface insert includes an outer bushing 66a which is sealed relative to the molding machine by O-rings 68. A power insert 70a is positioned in the outer bushing 66a and is sealed relative thereto by an O-ring 72. The power insert 70a is so named because its right end convex surface 74a defines the optical power of the optical quality surface of the front mold half and also of the hydrogel soft contact lens which is subsequently molded in the polystyrene mold half. The two piece insert design on the left side of FIG. 6a allows the optical quality surface 74a of the power insert 70a to be machined on just the power insert, which simplifies the engineering and construction of the two piece insert 64. Moreover, different optical power (diopter) lenses can be produced by merely changing the power insert to substitute a different power insert having a different curvature convex end surface.

Figure 8A:
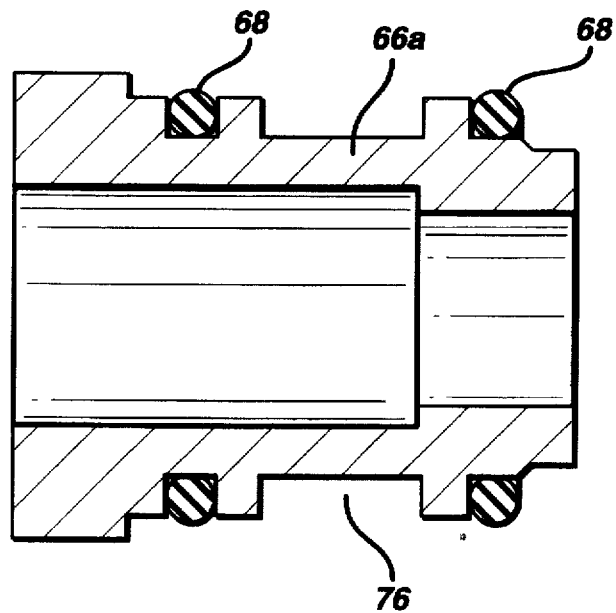
FIGS. 8a and 8b are sectional views of bushings employed with the power inserts on the optical quality side of the mold cavity of FIGS. 6a and 6b, respectively.

Referring now also to FIG. 8a, the first bushing 66a is shown in a side cross section view. The outer surface of the bushing 66a defines an outer circumferential cooling passageway 76 therearound, through which a coolant is continuously circulated. The circumferential cooling passageway could also be defined in the mold block which retains the bushing 66a, rather than in the bushing 66a, to reduce manufacturing costs.

A bubbler 78 is positioned within the power insert, through which coolant is continuously circulated and ejected against the inner internal surfaces of the power insert, and then flows outwardly in a reverse direction through the annular passageway around the bubbler insert.

The right side of the mold cavity of FIG. 6a defines the non-optical quality surface of the front mold half, and accordingly, in view of its simpler and less critical construction, is designed as a single piece insert bushing 80 which is sealed relative to the molding arrangement by O-rings 82. The bushing 80 includes an outer circumferential cooling passageway 84 through which a coolant is continuously circulated, and also mounts therein a bubbler insert 86, through which coolant is continuously circulated and ejected against the internal end surfaces of the insert 80, and then flows outwardly in a reverse direction through the annular passageway around the bubbler insert.

The coolant can be a solution of water and anticorrosion inhibitors, such as a 50/50 mixture of water and ethylene glycol. The coolant is continuously circulated in a turbulent flow mode by a cooling system having high power pumps to provide maximum cooling. Turbulent flow mode cooling is preferred to laminar flow cooling as it is approximately three times more effective than laminar flow cooling. Two separate coolant flow circuits are provided. The first coolant circuit has a high power pump with an 80 psi pressure head which circulates coolant at approximately 45°–85° C. at a flow rate from the pump of approximately 30±5 gallons per minute to cause the coolant to circulate continuously in a turbulent flow mode through the circumferential cooling passages of each mold cavity. The eight separate mold cavities as described hereinabove are typically connected in series in the first coolant circuit, with coolant flowing in series from one mold cavity to an adjacent mold cavity, etc. The second coolant circuit also has a high power pump with an 80 psi pressure head which circulates coolant at approximately 45°–85° C. at a flow rate from the pump of approximately 30±5 gallons per minute to cause the coolant to circulate continuously in a turbulent flow mode through the bubbler inserts in each mold cavity. A differential temperature range can be set to improve part quality.

The continuous flow of coolant through the outer circumferential cooling passages 76, 84 and the inner bubblers 78, 86 results in rapid cooling of the molded curves or mold halves to approximately 80°–90° C., at which temperature residual stresses are substantially locked into the molded component, particularly at the optical quality surface side, and the master mold halves can be opened along parting line (PL) to remove the molded curves or mold halves without damaging the optical quality surface of the mold halves. After opening of the master mold, a plurality of ejector pins 90, four positioned circumferentially around the mold cavity and a fifth 90' positioned at the mold tab, are displaced to the right as illustrated in FIG. 5, to eject the mold half from each cavity.

The systematic arrangement of the five ejector pins serves a useful purpose. The ejector pins are positioned to ensure minimal stress buildup in the part during part ejection; this is very important to ensure part dimensional consistency. One ejector pin is located at the distal end of the part (opposite side of the hot runner gate) to ensure adequate mold gas venting during the final filling phase, and the reduction of weld lines. The arrangement ensures smooth and reliable ejection after the part has reasonably cooled down and to minimize stress formation. This again ensures dimensional consistency. This concept lends well to cycle efficiency and deters parts from sticking to the wrong side of the mold.

Figure 9:
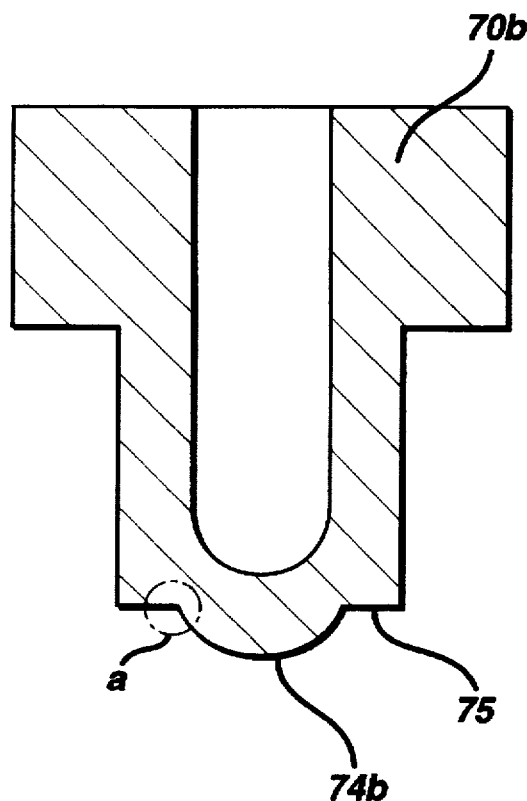
FIG. 9 is a cross sectional side view of the power insert of the second embodiment.

Referring now to FIG. 6b and FIG. 9, a second embodiment of the insert assembly for the manufacture of front curve mold halves is shown. As described with respect to the first variation illustrated in FIG. 6a, and set forth in the corresponding description thereof, the molten thermoplastic is extruded into the volume between the mold halves by a screw extruder 50. As above, the tip temperature of the extruder 50 and the heater manifold 52 provide the necessary flow characteristics to the molten thermoplastic. The molten thermoplastic material then flows into a hot runner system 56 which feeds two multi-tip extruders 58, each of which has four hot tip extrusion apertures 60. Temperature sensors, such as thermocouples, may be strategically positioned in the molding arrangement to monitor the temperature of the molten thermoplastic, for controlling heaters or other parameters of the molding operation.

The power insert of the embodiment illustrated in FIG. 6a includes an optical surface convex end which is entirely curvate. This power insert is disposed in a cylindrical bushing element 66a having a flat surface at the operational end. The junction of the bushing and power insert 70a at the operational end forms a sharp discontinuity in the geometric profile of the end. This sharp discontinuity forms the annular edge of the lens forming central portion of the subsequently manufactured mold halves.

The second variation, shown in FIG. 6b, includes a power insert 70b which includes an operational end comprising a convex central protuberance portion 74b and an annular flat surface 75 surrounding it. The interface between the convex portion 74b and the annular flat portion 75 comprises a sharp geometric discontinuity in the profile of the operational end of the insert, formed not by the junction of the bushing 66b and the insert 70b, but formed entirely by the specific surface profile of the end surface.

By providing this second power insert 70b with an annular flat surface 75 at its operational end, the critical optical surface 74b of the insert is protected against destructive contact with the inner surface features of the bushing 66b during removal and repositioning thereof, such as during cleaning, changing prescription strengths of the power inserts, and replacement.

Inasmuch as the repetitive use of the power inserts over thousands of molding cycles has an eroding effect on the power inserts, they preferably comprise a material which has considerable wear resistance to such use. In addition, inasmuch as the thermal cycling of the molding process involves significant changes in temperature, the material should have consistent and reliable thermal expansion characteristics. Further, inasmuch as a critical feature of the molding process relates to the rate at which heat may be drawn out of the plastic, the material must have a high thermal conductivity. A material which has generally been utilized for such inserts is stainless steel, however, alternative materials and combinations of materials which have desirable characteristics are described in detail hereinbelow.

The body of the power insert 70b (shown in FIG. 9) may alternatively be constructed of CuZn, such CuZn30, CuNiSiCr, or Vascomax (a martensitic steel alloy having significant nickel and cobalt constituent percentages). The power inserts are premachined to approximate dimensions and are then plated with a layer electroless Nickel-Phosphor coating such as type OMI 410 with a phosphor content of 10 to 13% available from OMI International or Shipley type Niposit 90 with a phosphor content of 10 to 13%. A plurality of alternative plating materials may be utilized, for example chrome nitride or silicone oxide. The surface maybe plated to a thickness of approximately 180 microns.

The plated surface of the optical insert is then turned using mono-crystalline diamond cutters, to a layer thickness of approximately 90 microns, therein imparting optimal optical characteristics including good sphericity (0.1—0.3 w) and low surface roughness (4–6 nm RMS) and minimal surface pitting. The use of a monocrystalline diamond cutter also provides an ultra-sharp transition or discontinuity at the interface of the convex portion 74b and the annular flat surface 75 therearound as illustrated in FIG. 9a, which is an enlarged view of portion a circled in FIG. 9.

The ultrasharp transition provides a "knife edge" radius of 10 micrometers to 40 micrometers that is formed on the front curve mold half. This edge provides for uniform seating of the front curve mold half when the two halves are assembled, and provides a parting edge to sever excess monomer from the monomer in the mold cavity as the two halves are assembled.

Figure 9A:
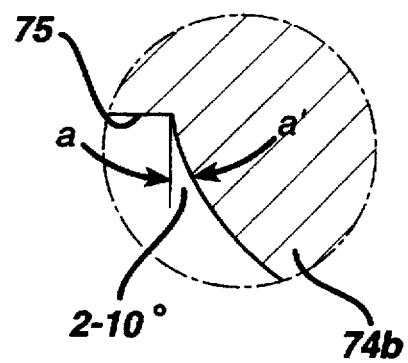
FIG. 9a is an enlarged view of a position of the power insert illustrated in FIG. 9.
Figure 6B:
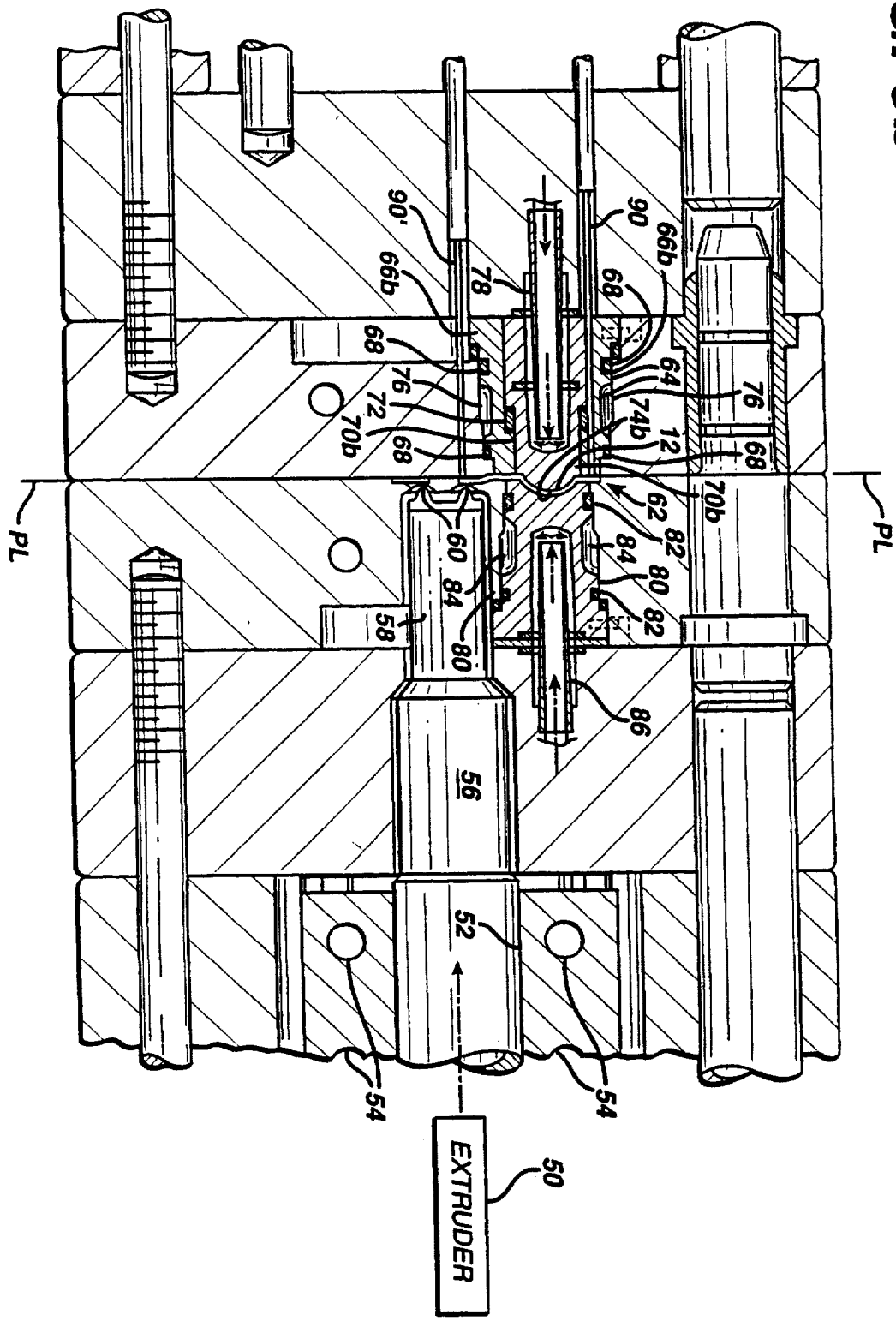
Figure 6A:
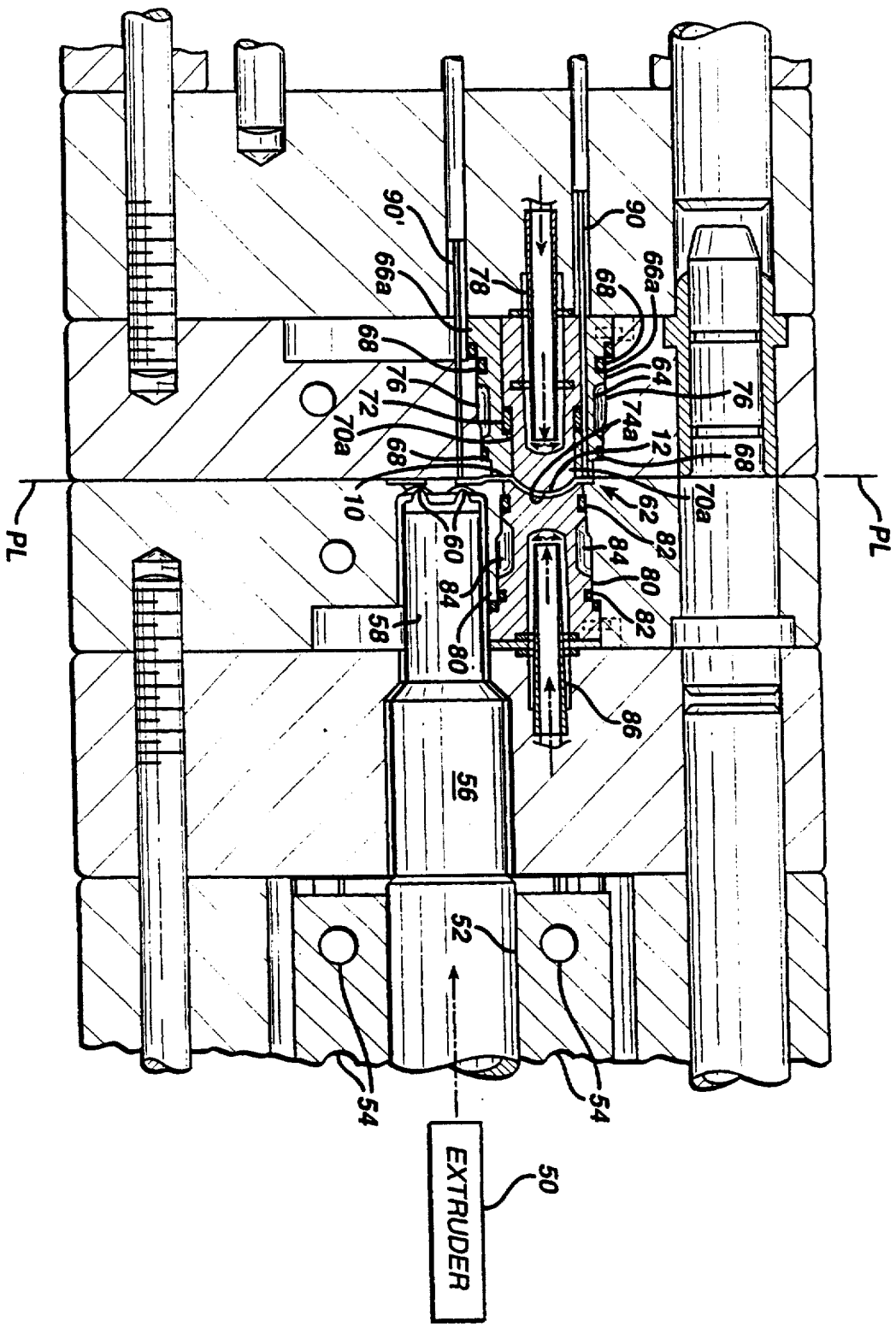

As illustrated in FIG. 9(a) the ultra sharp transition, diagrammatically illustrated as the angle between arrows a–a' may be from 2° to 10° for desired length of 20 to 200 micrometers as necessary to create the knife edge 14 illustrated in FIG. 2A.

This slight taper allows the plastic mold part to be ejected off protuberance 74b without causing damage or deformation of the knife edge, and ensures tight plastic tolerance and high reproduciblity for lenses molded therefrom, since the individual mold parts seal to one another in a more consistent manner.

This sharpness of the "knife edge" thus produced enhances the production of the lenses inasmuch as the plastic mold parts will not include stray plastic formed at the edge of the lens defining curvature as a result of plastic being received in the junction between the bushing and the power insert. In the present invention, if molten plastic should seep into free space between the power insert and the bushing in this variation, such stray plastic features would be in the flange portion and sufficiently remote from the optically relevant portion of the mold as to be insignificant in the production of the lenses.

The use of polished stainless steel power inserts requires careful matching of the insert to the bushing, with a desired axial tolerance of 5 to 10 microns. This tolerance is difficult to achieve with conventional tool and die technology, which forms the steel power inserts with multiple grind, polish and inspect steps, which may require 10 to 15 repetitions to achieve the desired sphericity and surface smoothness.

At each grind polish and inspect step, the axial dimensions is slightly altered, and with multiple steps, final assembly requires a shim assemble to achieve the desired axial dimension. Further, each time the power is changed and a new power insert used, the matching of the specific insert and its stacking shims to a specific bushing, must be maintained. In as much as there may be 8 to 16 sets of individual bushing insert assemblies for each power of lens manufactured, the process requires matching and assembly of literally hundreds of mold inserts for each injection molding machine. Further, if one is damaged, the shim stack assembly must be carefully reconstructed, possibly creating significant downtime for the injection molding machine.

The combination of diamond point turning and forming the knife edge in the insert, thus alleviates much of this custom matching and shim stacking and thus improves the yield of the injection molding line.

The use of brass or brass alloys in lieu of steel further enhances the conduction of heat from the mold half during molding thereof. While the electroless NiP coating provides necessary corrosion resistance, and with diamond point turning, provides the desired sherericity and surface smoothness.

Alternate forming processes have used diamond point turning off a brass alloy power insert to create a power insert of desired physical properties, with a thin coating of Shipley "Gloss 434" electrolens NiP or 0.5 micron layers of Cr and CrN deposited on the insert by magnatron spattering to provide the desired corrosion resistance.

Additional surface treatments and hardness coatings may be applied after the final machining of the inserts and the layers may range in thicknesses from 0.2 to 200 µm. Optionally, the final layer may be turned to thickness of 8 to 20 mm. In one hardening process, the inserts were heat treated in an $N_2$ environment.

The use of computer controlled diamond point turning allow the creation of complex geometric forms, such a bifocal, aspheric tonic, parabolic and elliptical geometry, not commercially feasible with conventional tool and die "grind, polish and inspect" technology.

For example, FIG. 10a illustrates in front view a multi-ring bifocal contact lens having a series of concentric multi-focal zones with smooth transition zones. Such a contact lenses is highly useful as a bifocal contact lens, as taught in U.S. Ser. No. 434,933 entitled Multifocal Ophthalmic Lens filed May 4, 1995, assigned to the assignee of the present invention.

The cross section of the lens in FIG. 10(a) is illustrated, approximately to the same scale in FIG. 10(b), where it is apparent that the smooth transitions between powers of concentric rings are extremely subtle.

FIG. 10(c) illustrates these transition with exaggerated detail for the purposes of illustration. Each of the annular optical zones 101–104 is formal with a difficult radius on the face of protoface 74(b) with smooth transitions therebetween. While technically feasible for "one-off" molds, the requirement for close matching large numbers of sets of these power inserts makes the use of conventional for commercial manufacturing could be extremely difficult, not impractical. However, the combination of the diamond point turning with plated inserts makes it possible to generate substantial numbers of nearly identical power inserts having complex geometries. This geometry is calculated and created in three dimensional mathematical models in a computer program such as Auto Cad, and transferred to computer aided manufacturing program such as Smartcam in order to programmably guide the diamond point turning machine axis.

Simple geometry inserts can also be formed with a multi axis grinder.

Figure 8B:
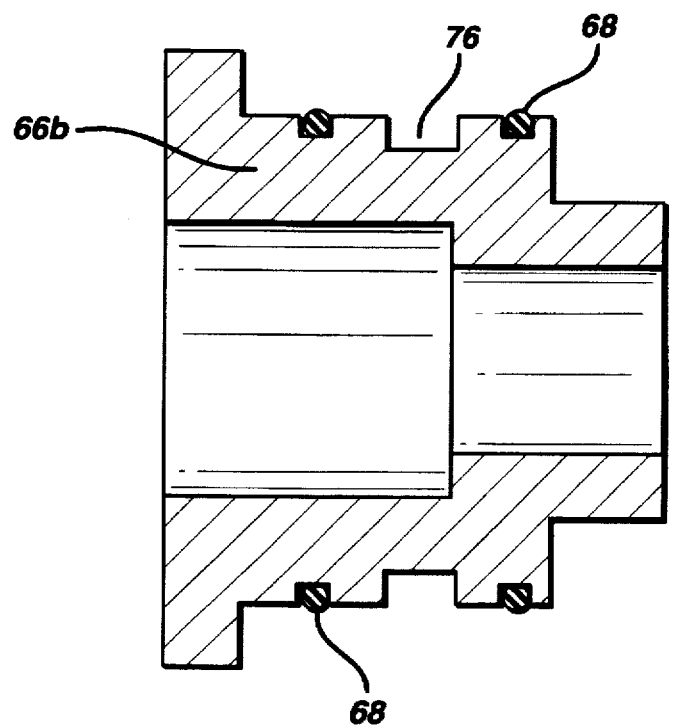

Referring now also to FIGS. 8a and 8b, the first and second bushings 66a,66b which correspond to the first and second embodiments, respectively, are shown in a side cross section. As with the first variation, the outer surface of the bushing 66a defines an outer circumferential cooling passageway 76 therearound, through which a coolant is continuously circulated. The inner surface of the bushing 66b comprises a wider passageway to permit the wider second power insert to be placed. This second bushing 66b is effectively similar to the first bushing 66a, but for having been bored out so that it may receive the larger power insert.

A bubbler 78 is positioned within the power insert, through which coolant is continuously circulated and ejected against the inner internal surfaces of the power insert, and then flows outwardly in a reverse direction through the annular passageway around the bubbler insert.

The right side of the mold cavity of FIG. 6b, which defines the non-optical quality surface of the front mold half, may be identical to the first variation, having a single piece insert bushing 80 which is sealed relative to the molding arrangement by O-rings 82. The bushing 80 also includes a circumferential cooling passageway 84 on its external surface, through which a coolant is continuously circulated. A bubbler insert 86, through which coolant is continuously circulated and ejected against the internal end surfaces of the insert 80, is also provided.

The arrangement of the ejector pins relative to the expanded interior passage of the bushing is similar to that of the first variation, however, care must be taken to insure that the wall thickness of the bushing is sufficient to permit perpendicular travel of the pins.

As described hereinabove, FIGS. 6a and 6b illustrate two variations for the manufacture of the front mold halves 10. The back mold halves 30 are molded in a similar arrangement as illustrated in FIG. 7, with similar mold inserts, except that the power insert 94 now has a concave optical quality end surface as the back mold halves 30 have an optical quality surface on their convex surface rather than on their concave surface.

FIG. 7 is a sectional view through a hot runner mold similar to that of FIGS. 6a and 6b, but for a back mold half 30. The convex surface of the back mold half defines the optical quality surface, and accordingly the convex surface of the back mold half is positioned on the left side in the molding arrangement of FIG. 7.

While several embodiments and variations of the present invention for a molding arrangement with a mold insert design to achieve short mold cycle time are described in detail herein, it should be apparent that the disclosure and teachings of the present invention will suggest many alternative designs to those skilled in the art.

What is claimed is:

1. A molding apparatus for producing at least one mold half which is used for subsequently molding a soft contact lens therewith, comprising:

at least one first structure having a convex curved surface defining an optical quality curved surface;

at least one corresponding second structure having a concave curved surface disposed in proximal spaced relation to said convex surface, said first and second structures defining therebetween a volume wherein a mold half is formed;

a hot runner system connected to the volume between said first and second structures for delivering a quantity of molten material of which the mold half is to be formed;

said optical quality curved surface of said first structure being positioned further away from said hot runner system than said concave curved surface of said at least one second structure, such that the subsequently molded mold half comprises a concave optical quality lens forming surface;

said at least one first structure comprising a bushing having a hollow cylindrical shape and a power insert, said insert being positioned within said bushing and having an end surface protruding from one end of said bushing wherein said end surface comprises said optical quality curved surface, said insert further comprising a flat annular surface surrounding said optical quality curved surface; and a cooling system for cooling at least one of said first and second structures, wherein the positioning of the optical quality curved surface further away from the heated hot runner system, and the cooling system, provide for faster cooling of molten material which forms the mold half at the optical quality surface than the other surface of the mold half to allow quicker setting so that minimal residual stresses remain in the material which forms the optical quality curved surface of the mold half, and also provides faster molding and cycling time.

2. The molding apparatus as set forth in claim 1, wherein said at least one first structure includes a NiP coating to define the optical quality curved surface.

3. The molding apparatus as set forth in claim 1, wherein said cooling system includes circumferential cooling passageways defined about an exterior surface of said first and second structures through which coolant is circulated.

4. The molding apparatus as set forth in claim 3, wherein at least one of said first and second structures comprises an axial recess therein, and wherein the cooling system further comprises a bubbler positioned within said axial recess for circulating coolant against inner surfaces of the structure.

5. The molding apparatus as set forth in claim 4, wherein said cooling system includes means for circulating coolant in a turbulent flow mode through the circumferential cooling passageways, and through the bubblers.

6. The molding apparatus set forth in claim 1, wherein the molding arrangement includes a plurality of first and second structures for simultaneously producing a plurality of mold halves.

7. The molding apparatus as set forth in claim 6, wherein a plurality of ejector pins are positioned within one of said first and second structures for engaging and ejecting mold halves from the mold apparatus.

8. The molding apparatus as set forth in claim 7, wherein said first and second structures include corresponding annular surfaces, adjacent to said convex and concave surfaces, between which a flat flange portion of said mold half may be formed simultaneously with respect to the formation of the mold half itself.

9. The molding apparatus as set forth in claim 8, wherein said ejector pins are positioned so as to engage the mold halves around said flat flange so that stresses on the curved surfaces of said mold half may be minimized during ejection thereof from the molding arrangement.

10. A molding apparatus for producing at least one mold half which is used for subsequently molding a soft contact lens therewith, comprising:

first and second reciprocating blocks, having opposing faces, said blocks reciprocating relative to one another so that the opposing faces meet and separate in a regular repetitive molding cycle;

at least one first structure, mounted within said first reciprocating block, said first structure including a hollow cylindrical bushing and a power insert disposed therein, said power insert defining a convex curved surface which protrudes from the face of said first reciprocating block and a flat annular surface surrounding the convex surface, said convex curved surface and said flat annular surface establishing an interface, said interface comprising a discontinuous profile so as to provide a sharp edge in the mold half produced thereby, said discontinuous profile being provided entirely by said insert;

at least one corresponding second structure, mounted within said second reciprocating block, said second structure having a concave curved surface which forms a recession in the face of said second block, wherein said convex curved surface of said first structure and said concave curved surface of said second structure are disposed in proximal spaced relation to one another and define therebetween a volume wherein a mold half is formed when said opposing faces meet;

said convex curved surface being an optical quality curved surface for imparting an optical quality to a concave surface of the mold half formed thereby;

a hot runner system connected to the volume between said first and second structures for delivering a quantity of molten material of which the mold half is to be formed, wherein said at least one first structure having the optical quality surface is positioned further from the heated hot runner system than said at least one second structure; and wherein the positioning of the optical quality curved surface further away from the heated hot runner system provides for faster cooling of molten material which forms the concave optical quality surface of the mold half than the other surface of the mold half to allow quicker setting so that minimal residual stresses remain in the material which forms the optical quality curved surface of the mold half, and also provides faster molding cycle.

11. The molding apparatus as set forth in claim 10, further including a cooling system comprising:

at least one circumferential passageway defined in an exterior surface of said bushing;

at least one axial recess in said power insert;

means for circulating a coolant fluid within said circumferential passageway of said bushing and within said axial recess of said power insert.

12. The molding apparatus as set forth in claim 10, wherein a plurality of ejector pins are positioned within the bushing for engaging and ejecting mold halves from the mold apparatus.

13. The molding apparatus as set forth in claim 12, wherein said second structure also includes a corresponding annular flat surface, adjacent to said concave surfaces.

14. The molding apparatus as set forth in claim 13, wherein said ejector pins are positioned so as to engage the mold halves around said flat flange so that stresses on the curved surfaces of said mold half may be minimized during ejection thereof from the molding arrangement.

15. The molding apparatus as set forth in claim 10, wherein the bushing comprises at least a portion of said annular flat surface.

16. The molding apparatus as set forth in claim 15, wherein the power insert is formed of brass with a NiP coating.

17. A molding apparatus for producing at least one mold half which is used for subsequently molding a soft contact lens therewith, comprising:

first and second reciprocating blocks, having opposing faces, said blocks reciprocating relative to one another so that the opposing faces meet and separate in a regular repetitive molding cycle;

at least one first structure, mounted within said first reciprocating block, said first structure including:

a hollow cylindrical bushing having annular flat surface recession at one end thereof, and a power insert disposed within said bushing having a convex curved surface which protrudes from the face of said first reciprocating block, and an annular flat surface surrounding said convex curved surface, the interface of said annular flat surface thereof and said convex curved surface defining a discontinuous profile, said power insert comprising a thermally conductive material selected from the group comprising brass, copper-nickel-silicon-chromium, or cobalt and nickel alloyed martensitic steel, said power insert further comprising a chrome nitride coating on at least a portion of said convex curved surface;

whereby an annular flat flange portion of said mold half may be formed simultaneously with the formation of the mold half by the annular flat surfaces of said bushing and said power insert;

at least one corresponding second structure, mounted within said second reciprocating block, said second structure having a concave curved surface which forms a recession in the face of said second block, wherein said convex curved surface of said first structure and said concave curved surface of said second structure are disposed in proximal spaced relation to one another and define therebetween at least a portion of a volume wherein a mold half is formed when said opposing faces meet;

said convex curved surface being an optical quality curved surface for imparting an optical quality to a concave surface of the mold half formed thereby;

a hot runner system connected to the volume between said first and second structures for delivering a quantity of molten material of which the mold half is to be formed.

18. The molding apparatus as set forth in claim 17, wherein power insert is formed of chrome nitride coated brass.

19. The molding apparatus as set forth in claim 17, further including a cooling system comprising:

at least one circumferential passageway defined in an exterior surface of said bushing;

at least one axial recess in said power insert;

means for circulating a coolant fluid within said circumferential passageway of said bushing and within said axial recess of said power insert.

20. The molding apparatus as set forth in claim 17, wherein a plurality of ejector pins are positioned within the bushing for engaging the flat flange of said mold half and ejecting same from the mold apparatus.

21. The molding apparatus as set forth in claim 2, wherein said nickel phosphor coating has been diamond turned to a thickness of 0.2 to 100 micrometers.

22. The molding apparatus as set forth in claim 21, wherein said nickel phosphor coating has a thickness of 8 to 20 mm.

23. The molding apparatus as set forth in claim 17, wherein said power insert has been hardened by heat treating.

24. A molding apparatus for producing at least one mold half which is used for subsequently molding a soft contact lens therewith, comprising:

first and second reciprocating blocks, having opposing faces, said blocks reciprocating relative to one another so that the opposing faces meet and separate in a regular repetitive molding cycle;

at least one first structure, mounted within said first reciprocating block, said first structure including a hollow cylindrical bushing and a power insert disposed therein, said power insert defining a convex curved surface which protrudes from the face of said first reciprocating block and a flat annular surface surrounding the convex surface, said convex curved surface and said flat annular surface establishing an interface, said interface comprising a discontinuous profile so as to provide a sharp edge in the mold half produced thereby, said discontinuous profile being provided entirely by said insert and having a radius of 10 to 40 micrometers;

at least one corresponding second structure, mounted within said second reciprocating block, said second structure having a concave curved surface which forms a recession in the face of said second block, wherein said convex curved surface of said first structure and said concave curved surface of said second structure are disposed in proximal spaced relation to one another and define therebetween a volume wherein a mold half is formed when said opposing faces meet;

said convex curved being an optical quality curved surface for imparting an optical quality to a concave surface of the mold half formed thereby;

a hot runner system connected to the volume between said first and second structures for delivering a quantity of molten material of which the mold half is to be formed, wherein said at least one first structure having the optical quality surface is positioned further from the heated hot runner system than said at least on second structure; and wherein the positioning of the optical quality curved surface further away from the heated hot runner system provides for faster cooling of molten material which forms the concave optical quality surface of the mold half than the other surface of the mold half to allow quicker setting so that minimal residual stresses remain in the material which forms the optical quality curved surface of the mold half, and also provides faster molding cycle.

25. The molding apparatus as set forth in claim 24, further including a cooling system comprising:

at least one circumferential passageway defined in an exterior surface of said bushing;

at least one axial recess in said power insert;

means for circulating a coolant fluid within said circumferential passageway of said bushing and within said axial recess of said power insert.

26. The molding apparatus as set forth in claim 24, wherein a plurality of ejector pins are positioned within the bushing for engaging and ejecting mold halves from the mold apparatus.

27. The molding apparatus as set forth in claim 26, wherein said second structure also includes a corresponding annular flat surface, adjacent to said concave surfaces.

28. The molding apparatus as set forth in claim 27, wherein said ejector pins are positioned so as to engage the mold halves around said flat flange so that the stresses on the curved surfaces of said mold half may be minimized during ejection thereof from the molding arrangement.

29. The molding apparatus as set forth in claim 24, wherein the bushing comprises at least a portion of said annular flat surface.

30. The molding apparatus as set forth in claim 29, wherein the power insert is formed of brass with a NiP coating.

31. A molding apparatus for producing at least one mold half which is used for subsequently molding a soft contact lens therewith, comprising:

first and second reciprocating blocks, having opposing faces, said blocks reciprocating relative to one another so that the opposing faces meet and separate in a regular repetitive molding cycle;

at least one first structure, mounted within said first reciprocating block, said first structure including a hollow cylindrical bushing and a power insert disposed therein, said power insert defining a convex curved surface which protrudes from the face of said first reciprocating block and a flat annular surface surrounding the convex surface, said convex curved surface and said flat annular surface establishing an interface, said interface comprising a discontinuous profile including an annular tapered wall having a taper of 2° to 10° to provide a sharp edge in the mold half produced by said apparatus;

at least one corresponding second structure, mounted within said second reciprocating block, said second structure having a concave curved surface which forms a recession in the face of said second block, wherein said convex curved surface of said first structure and said concave curved surface of said second structure are disposed in proximal spaced relation to one another and define therebetween a volume wherein a mold half is formed when said opposing faces meet;

said convex curved being an optical quality curved surface for imparting an optical quality to a concave surface of the mold half formed thereby;

a hot runner system connected to the volume between said first and second structures for delivering a quantity of molten material of which the mold half is to be formed, wherein said at least one first structure having the optical quality surface is positioned further from the heated hot runner system than said at least on second structure; and wherein the positioning of the optical quality curved surface further away from the heated hot runner system provides for faster cooling of molten material which forms the concave optical quality surface of the mold half than the other surface of the mold half to allow quicker setting so that minimal residual stresses remain in the material which forms the optical quality curved surface of the mold half, and also provides faster molding cycle.

32. The molding apparatus as set forth in claim 31, further including a cooling system comprising:

at least one circumferential passageway defined in an exterior surface of said bushing;

at least one axial recess in said power insert;

means for circulating a coolant fluid within said circumferential passageway of said bushing and within said axial recess of said power insert.

33. The molding apparatus as set forth in claim 31, wherein a plurality of ejector pins are positioned within the bushing for engaging and ejecting mold halves from the mold apparatus.

34. The molding apparatus as set forth in claim 33, wherein said second structure also includes a corresponding annular flat surface, adjacent to said concave surfaces.

35. The molding apparatus as set forth in claim 34, wherein said ejector pins are positioned so as to engage the mold halves around said flat flange so that the stresses on the curved surfaces of said mold half may be minimized during ejection thereof from the molding arrangement.

36. The molding apparatus as set forth in claim 31, wherein the bushing comprises at least a portion of said annular flat surface.

37. The molding apparatus as set forth in claim 36, wherein the power insert is formed of brass with a NiP coating.

38. A molding apparatus for producing at least one mold half which is used for subsequently molding a soft contact lens therewith, comprising:

first and second reciprocating blocks, having opposing faces, said blocks reciprocating relative to one another so that the opposing faces meet and separate in a regular repetitive molding cycle;

at least one first structure, mounted within said first reciprocating block, said first structure including:

a hollow cylindrical bushing having annular flat surface recession at one end thereof, and a power insert disposed within said bushing having a convex curved surface which protrudes from the face of said first reciprocating block, and an annular flat surface surrounding said convex curved surface, the interface of said annular flat surface thereof and said convex curved surface defining a discontinuous profile, said power insert comprising a thermally conductive material selected from the group comprising brass, copper-nickel-silicon-chromium, or cobalt and nickel alloyed martensitic steel, said power insert further comprising a silicone oxide coating on at least a portion of said convex curved surface;

whereby in annular flat flange portion of said mold half may be formed simultaneously with the formation of the mold half by the annular flat surfaces of said bushing and said power insert;

at least one corresponding second structure, mounted within said second reciprocating block, said second structure having a concave curved surface which forms a recession in the face of said second block, wherein said convex curved surface of said first structure and said concave curved surface of said second structure are disposed in proximal spaced relation to one another and define therebetween at least a portion of a volume wherein a mold half is formed when said opposing faces meet;

said convex curved surface being an optical quality curved surface for imparting an optical quality to a concave surface of the mold half formed thereby;

a hot runner system connected to the volume between said first and second structures for delivering a quantity of molten material of which the mold half is to be formed.

39. The molding apparatus as set forth in claim 38, wherein power insert is formed of silicone oxide coated brass.

40. The molding apparatus as set forth in claim 38, further including a cooling system comprising:

at least one circumferential passageway defined in an exterior surface of said bushing;

at least one axial recess in said power insert;

means for circulating a coolant fluid within said circumferential passageway of said bushing and within said axial recess of said power insert.

41. The molding apparatus as set forth in claim 38, wherein a plurality of ejector pins are positioned within the bushing for engaging the flat flange of said mold half and ejecting same from the mold apparatus.

42. The molding apparatus as set forth in claim 16, wherein said nickel phosphor coating has been diamond turned to a thickness of 0.2 to 100 micrometers.

43. The molding apparatus as set forth in claim 42, wherein said nickel phosphor coating has a thickness of 8 to 20 mm.

44. The molding apparatus as set forth in claim 38, wherein said power insert has been hardened by heat treating.

* * * * *

UNITED STATES PATENT AND TRADEMARK OFFICE
CERTIFICATE OF CORRECTION

PATENT NO. : 5,702,735  
DATED : December 30, 1997  
INVENTOR(S) : Wallace A. Martin et al.

It is certified that error appears in the above-indentified patent and that said Letters Patent is hereby corrected as shown below:

Replace Figures 6a and 6b with the attached Figures 6a and 6b.

Signed and Sealed this

Eighth Day of December, 1998

Attest:

BRUCE LEHMAN

Attesting Officer

Commissioner of Patents and Trademarks